United States Patent Office 3,803,143
Patented Apr. 9, 1974

3,803,143
6-AMINO ALKYLENE 6,7-DIHYDRO-5H-DIBENZO [b,g], [1,5]THIAZOCINES
Satoru Tanaka and Kazunori Hashimoto, Tokyo, Japan, assignors to Eisai Kabushiki Kaisha, Tokyo, Japan
No Drawing. Filed Sept. 2, 1970, Ser. No. 69,166
Claims priority, application Japan, Sept. 8, 1969, 44/70,561
Int. Cl. C07d 87/46
U.S. Cl. 260—247.1                    10 Claims

ABSTRACT OF THE DISCLOSURE

Eight-membered heterocyclic compounds, especially 6-substituted 6,7-dihydro-5H-dibenzo[b,g], [1,5]oxazocine and corresponding thiazocine as well as pharmacologically acceptable salts thereof having an outstanding anti-depressant activity on the nervous system. The new compounds are useful for the treatment of disease such as depressions, for example, depressions caused by climacteric and middle-aged syndromes, arteriosclerosis and Parkinson's disease. The invention also involves a process for the production of the new compounds.

---

This invention relates to new eight-membered oxazicine and thiazocine compounds, and more particularly 6-substituted 6,7 - dihydro - 5H - dibenzo[b,g],[1,5]oxazocine and corresponding thiazocine and also to process for the production thereof.

The specific oxazocine and thiazocine compounds which are the subject of the present invention are represented by the general formula;

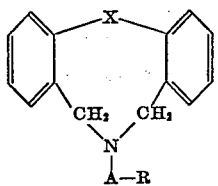

wherein X is oxygen or sulfur atom, A is straight or branched lower alkylene group, R is hydrogen hydroxyl, monoalkylamino, dialkylamino or heterocyclic amino, or a phenyl group which may or may not be substituted with a lower alkyl or lower alkoxy group or a halogen atom.

It has been found that the new compounds of the present invention show an enhanced activity especially a strong anti-depressant activity to the nervous system.

We have carried out animal experiments with a large number of the compounds included within the aforementioned General Formula I to evaluate the inhibition activity of the said compounds toward blepharoptosis of mice caused by administration of Tetrabenazine.

In the experiment, the known anti-depressant Imipramine was employed as a control.

It has been confirmed through these experiments that the following compounds among others show a pronounced anti-depressant activity:

(a) 6 - (β - dimethylaminoethyl) - 6,7 - dihydro - 5H-dibenzo[b,g], [1,5]oxazocine dihydrochloride which hereinafter is called Compound A;

(b) 6 - (β - diethylaminoethyl) - 6,7 - dihydro - 5H-dibenzo[b,g], [1,5]thiazocine dihydrochloride which hereinafter is called Compound B; and (c) 6 - (γ - methylaminopropyl) - 6,7 - dihydro - 5H-dibenzo[b,g], [1,5]thiazocine dihydrochloride which hereinafter is called Compound C.

Each 100 mg./kg. of the compounds under experiment was subcutaneously injected to mice and after a lapse of 30 minutes, 40 mg./kg. of Tetrabenazine were intraperitoneally administered.

The resulting inhibition activities of the compounds are designated by the percent inhibition against the blepharoptosis caused on mice by the given amount of Tetrabenazine.

The data observed are listed:

| Compounds: | Inhibition (percent) |
|---|---|
| A | 60 |
| B | 85 |
| C | 73 |
| Imipramine (control) | 41 |

In view of these data, it has been concluded that the above compounds of the present invention show a strong anti-depressant activity as compared with Imipramine.

Toxicity (acute toxicity) of the compounds of the present invention determined by intravenous injection of the compounds to mice is around $LD_{50} \geq 100$ mg./kg. far less than that of $LD_{50} \leq 35$ mg./kg. presented by Imipramine.

The novel compounds of the present invention can be employed for treatment of diseases such as internal depression, for example, depression caused by climacteric and middle-aged difficulties and arteriosclerosis; the depressive conditions caused by partitive psychosis and also Parkinson's disease.

The chemical reaction which takes place in the preparation of the particular compounds according to the process of the present invention is illustrated by the following schematic equation:

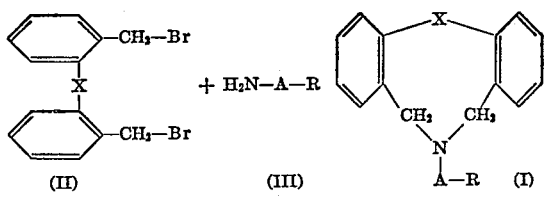

wherein X, R and A have the same meanings as in structural Formula I.

In the practice of the invention, 2,2'-dibromodimethyl diphenyloxide or the corresponding sulfide (II) is subjected to reaction with the primary amine (III) to produce the desired compound, i.e., 6,7-dihydro-5H-dibenzo [b,g], [1,5]oxazocine or the corresponding thiazocine (I). The reaction may be carried out in the absence of solvent or the presence of a non-polar solvent such as benzene and toluene, or a polar solvent such as acetone and ethanol.

The reaction is advantageously accelerated with the aid of a conventional acid-binding agent such as potassium and sodium carbonates, pyridine and triethylamine. Use of excess primary amine (III) as one of the reactants will simultaneously serve as an acid-binding agent. Purification of the resulting product can be effected by recrystallization from a solvent such as acetone and ethanol which may be used as the reaction medium.

2,2'-dibromodimethyl diphenyloxide and the corresponding sulfide used as starting materials in carrying out the process of the present invention are new compounds and are preferably prepared in accordance with the following referential examples.

REFERENTIAL EXAMPLE 1

Preparation of 2,2'-dibromodimethyl diphenyloxide 59 grams of 2,2'-dimethyl diphenyloxide were dissolved under 100 ml. of ethylene bromide. To the solution which was kept in reflux with stirring is added drop by drop a solution which contained 96 grams of bromine in 60 ml. of ethylene bromide under irradiation of ultraviolet ray in a course of 4 hours. When the addition of the bromine solution was completed, the reaction was further continued for 1.5 hours and it was then allowed to cool. The reaction mixture was washed three times with water and dried over Glover's salt. The solvent was removed from the reaction mixture by distillation, and the residue was subjected to vacuum distillation. A fraction boiling at 176°–215° C./0.6 mm. Hg was recovered as the desired compound which soon solidified. The product was recrystalized from petroleum benzine and there was obtained 41.8 grams of pure compound having a melting point of 90°–91° C. Yield was 39 percent basing on the original diphenyloxide.

Elementary analysis of the product gave:

Calculated (percent) as $C_{14}H_{12}OBr_2$: C, 47.23; H, 3.30. Found (percent): C, 47.04; H, 3.47.

REFERENTIAL EXAMPLE 2

Preparation of 2,2'-dibromodimethyl diphenylsulfide 32 grams of 2,2'-dimethyldiphenylsulfide and 48 grams of bromine in 150 ml. of ethylene bromide were subjected to reaction in accordance with the procedure disclosed in the preceding referential example. A fraction boiling at 190°–234° C./1.0 mm. Hg was taken in cyclohexane and was allowed to settle for crystallization. 17.7 grams of the crystal were recovered having a melting point of 71°–72° C. Yield was 32.0 percent on the basis of the original diphenylsulfide.

Elementary analysis of the product gave:

Calculated (percent) as $C_{14}H_{12}SBr_2$: C, 45.19; H, 3.25. Found (percent): C, 44.96; H, 3.27.

The process for the production of the oxazocine and thiazocine starting from the products such as those obtained in the above referential examples is illustrated by the following working examples.

EXAMPLE 1

Preparation of 6-methyl-6,7-dihydro-5H-dibenzo-[b,g], [1,5]oxazocine 10.8 grams of 2,2'-dibromodimethyl diphenyloxide were dissolved in 50 ml. of benzene. The solution together with a solution containing 4.5 grams of methylamine in 30 ml. of benzene was charged to an autoclave. The closed autoclave was heated to 80° C. for 5 hours to effect the reaction.

At this time, the benzene solvent was removed by distillation from the reaction mixture, and the residue was made alkaline by adding 100 ml. of a 20% aqueous caustic soda solution. An oily layer separated out and was extracted three times with 50 ml. of benzene. The combined benzene extracts were shaken three times with a quantity of a 10% aqueous hydrochloric acid equal to an overall volume of 150 ml. The resulting aqueous acid layer was again made alkaline with a 10% aqueous solution of caustic soda and settled. The crystals which separated out were recovered by filtration and recrystallized from acetone. There were obtained 3.5 grams of the desired product having a melting point of 207°–209° C. Yield was 68 percent based on the original 2,2'-dibromodimethyl diphenyloxide.

Elementary analysis of the product gave:

Calculated (percent) as $C_{15}H_{15}NO$: C, 79.97; H, 6.71; N, 6.22. Found (percent): C, 79.67; H, 6.45; N, 6.19.

EXAMPLE 2

Preparation of 6-benzyl-6,7-dihydro-5H-dibenzo-[b,g], [1,5]oxazocine 14.2 grams of 2,2'-dibromodimethyl diphenyloxide, 4.4 grams of benzylamine and 8.4 grams of potassium carbonate were taken up in ethanol. The resulting reaction mixture was further worked up in accordance with the procedure disclosed in the preceding example.

There were obtained 7.8 grams of the compound aimed at melting at 137°–138° C. Yield was 6.7 percent on the basis of the original diphenyloxide.

Elementary analysis of the product gave:

Calculated (percent) as $C_{21}H_{19}NO$: C, 83.68; H, 6.35; N, 4.65. Found (percent): C, 83.44; H, 6.13; N, 4.35.

EXAMPLE 3

Preparation of 6-ethyl-6,7-dihydro-5H-benzo [b,g], [1,5]thiazocine 17.4 grams of 2,2'-dibromodimethyl diphenylsulfide were dissolved in 100 ml. of benzene. The solution was mixed with 100 ml. of ethanol which contained 10 grams of ethylamine, and the whole was charged into a pressure bottle. The bottle was heated to 80° C. for 7 hours to complete the reaction.

At the end of this period, the volatile solvents were distilled off and the solid residue was mixed with 100 ml. of water.

The resulting aqueous phase was made alkaline and extracted three times with benzene. The combined benzene extracts were shaken with a dilute hydrochloric acid to extract the basic product. The hydrochloric acid layer was concentrated by evaporation to dryness. The desired compound was obtained in the form of its hydrochloride which was recrystallized from benzene. 7.0 grams of the purified hydrochloride melting at 210°–212° C. were thus recovered. Yield was 48 percent based on the original diphenylsulfide.

Elementary analysis of the product gave:

Calculated (percent) as $C_{16}H_{17}NS \cdot HCl$: C, 65.85; H, 6.21; N, 4.80. Found (percent): C, 65.48; H, 6.42; N, 4.59.

EXAMPLE 4

Preparation of 6-(2'-dimethylaminoethyl)-6,7-dihydro-5H-dibenzo[b,g], [1,5]oxazocine 7.8 grams of 2,2'-dibromodimethyl diphenyloxide and 4.4 grams of N,N-dimethylethylenediamine together with 7 grams of potassium carbonate in ethanol were subjected to reaction in accordance with the procedure disclosed in Example 3. There were obtained 9.9 grams of the desired compound as its dihydrochloride. Yield was 56 percent basing on the employed diphenyloxide.

Elementary analysis of the product gave:

Calculated (percent) as $C_{18}H_{22}NO \cdot 2HCl$: C, 60.85; H, 6.81; N, 7.89. Found (percent): C, 60.58; H, 6.69; N, 7.58.

EXAMPLE 5

Preparation of 6-(γ-dimethylaminopropyl)-6,7-dihydro-5H-dibenzo[b,g], [1,5]oxazocine 25.6 grams of 2,2'-dibromodimethyl diphenyloxide and 11.0 grams of N,N-dimethylpropylenediamine were dissolved in 150 ml. of benzene.

The resulting benzene solution was charged to a sealed tube and subjected to reaction by heating it for 5 hours.

When the reaction was over, the reaction mixture recovered from the tube was subjected to distillation to remove the volatile medium, and the residue obtained was treated with a 20% aqueous solution of caustic soda. An oily substance separated out was extracted three times with 50 ml. of benzene. The combined benzene extracts were washed with 100 ml. of water, dried over potassium carbonate and the benzene was finally removed therefrom by distillation. The desired free base was obtained as a solid having a melting point of 135°–139° C.

The solid base was dissolved in ethanol and was reacted with an equimolecular proportion of maleic acid in the conventional manner to convert the base into its maleate. The maleate was recrystallized from a benzene/methanol mixture. There were obtained 32.2 grams of the product melting at 238°–238.5° C. Yield was 80.0 percent, on the basis of the original diphenyloxide.

Elementary analysis of the product gave:

Calculated (percent) as $C_{19}H_{24}O \cdot C_4H_4O_4$: C, 66.97; H, 6.84; N, 6.79. Found (percent): C, 66.62; H, 6.91; N, 6.84.

EXAMPLE 6

Preparation of 6-(β-morpholinoethyl)-6,7-dihydro-5H-dibenzo[b,g], [1,5]oxazocine 25.6 grams of 2,2'-dibromodimethyl diphenyloxide and 15.0 grams of β-morpholinoethylamine were dissolved in 100 ml. of ethanol. The resulting solution was further worked up in accordance with the procedure disclosed in Example 5.

There was obtained a free base melting at 201°–202° C. The base was converted into its maleate in the conventional manner, and 29.6 grams of the maleate having the melting point of 204°–205° C. with decomposition were obtained. Yield was 75.4 percent on the basis of the employed diphenyloxide.

Elementary analysis of the maleate gave:

Calculated (percent) as $C_{20}H_{24}N_2O_2 \cdot C_4H_4O_4 \cdot \tfrac{1}{2}H_2O$: C, 64.12; H, 6.51; N, 6.23. Found (percent): C, 63.93; H, 6.27; N, 6.37.

In similar processes to those aforementioned, there were obtained further compounds of the present invention which are listed in the following tables.

TABLE I

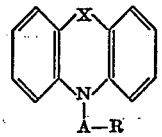

| No. | X | A | R | Molecular formula (Melting point, °C.) | | C | H | N |
|---|---|---|---|---|---|---|---|---|
| 7 | O | —CH$_2$—CH$_2$— | H | C$_{16}$H$_{17}$NO (212~3) | a | 80.30 | 7.16 | 5.85 |
| | | | | | b | 80.55 | 7.17 | 5.67 |
| 8 | O | —CH$_2$—CH$_2$—CH$_2$— | H | C$_{17}$H$_{19}$NO (162~5) | a | 80.57 | 7.56 | 5.53 |
| | | | | | b | 80.28 | 7.46 | 5.37 |
| 9 | O | CH$_3$<br>\|<br>—CH—CH$_2$— | H | C$_{17}$H$_{19}$NO (184~6) | a | 80.57 | 7.56 | 5.53 |
| | | | | | b | 80.32 | 7.61 | 5.44 |
| 10 | O | —CH$_2$—CH$_2$—CH$_2$—CH$_2$— | H | C$_{18}$H$_{21}$NO (132~3) | a | 80.86 | 7.92 | 5.24 |
| | | | | | b | 80.86 | 7.89 | 5.12 |

Note.—a = Calculated; b = Found.

TABLE II

| Number | X | A | R | Molecular formula (Melting point, °C.) | | C | H | N |
|---|---|---|---|---|---|---|---|---|
| 11 | O | CH$_3$<br>\|<br>—CH$_2$—C—<br>\|<br>CH$_3$ | H | C$_{18}$H$_{21}$NO (182~4) | a | 80.86 | 7.92 | 5.24 |
| | | | | | b | 80.69 | 7.82 | 5.00 |
| 12 | O | —CH$_2$—CH$_2$— | —OH | C$_{16}$H$_{17}$NO (206~9) | a | 75.27 | 6.71 | 5.49 |
| | | | | | b | 75.12 | 6.59 | 5.48 |
| 13 | O | —CH$_2$—CH$_2$—CH$_2$— | —OH | C$_{17}$H$_{19}$NO$_2$ (157~9) | a | 75.81 | 7.11 | 5.20 |
| | | | | | b | 76.08 | 7.27 | 5.12 |
| 14 | O | —CH$_2$— | ⟨phenyl⟩—CH$_3$ | C$_{21}$H$_{21}$NO (100~1) | a | 83.77 | 6.71 | 4.44 |
| | | | | | b | 83.52 | 6.54 | 4.17 |
| 15 | O | —CH$_2$— | ⟨phenyl, CH$_3$⟩ | C$_{21}$H$_{21}$NO (111~2) | a | 83.77 | 6.71 | 4.44 |
| | | | | | b | 83.56 | 6.58 | 4.16 |
| 16 | O | —CH$_2$— | ⟨phenyl⟩—Cl | C$_{21}$H$_{18}$NOCl (152~3) | a | 75.07 | 41 | 4.18 |
| | | | | | b | 75.09 | 5.55 | 4.26 |

See note at end of Table I.

TABLE III

| No. | X | A | R | Molecular formula (Melting point, °C.) | | Elementary analysis (percent) | | |
|---|---|---|---|---|---|---|---|---|
| | | | | | | C | H | N |
| 17 | O | —CH₂— | ⌬-Cl | C₁₃H₁₂NOCl (114~5) | a | 75.07 | 5.41 | 4.18 |
| | | | | | b | 74.95 | 5.28 | 4.29 |
| 18 | O | —CH₂— | ⌬-OCH₃ | C₂₂H₂₁NO₂ (153~4) | a | 79.43 | 6.39 | 4.23 |
| | | | | | b | 79.97 | 6.27 | 4.25 |
| 19 | O | —CH₂—CH₂— | —N(C₂H₅)₂ | C₂₀H₂₆N₂O·2HCl (230~1) | a | 62.59 | 7.36 | 7.30 |
| | | | | | b | 62.47 | 7.55 | 7.18 |
| 20 | S | —CH₂— | H | C₁₅H₁₅NS·HCl (216~7) | a | 64.85 | 5.80 | 5.04 |
| | | | | | b | 64.28 | 6.08 | 4.67 |
| 21 | S | —CH₂—CH₂—CH₂— | H | C₁₇H₁₉NS·HCl·½H₂O (215~7) | a | 64.86 | 6.94 | 4.45 |
| | | | | | b | 65.17 | 6.83 | 4.79 |
| 22 | S | —CH₂— | ⌬ | C₂₁H₁₉NS (92~3) | a | 79.46 | 6.04 | 4.42 |
| | | | | | b | 79.15 | 6.19 | 4.22 |

See note at end of Table I.

TABLE IV

| Number | X | A | R | Molecular formula (melting point, °C.) | | Elementary analysis (percent) | | |
|---|---|---|---|---|---|---|---|---|
| | | | | | | C | H | N |
| 23 | S | —CH₂—CH₂— | —OH | C₁₆H₁₇NOS·HCl (181~2) | a | 62.42 | 5.89 | 4.55 |
| | | | | | b | 62.07 | 6.32 | 4.30 |
| 24 | S | —CH₂—CH₂—CH₂— | —OH | C₁₇H₁₉NOS·HCl·½H₂O (133~6) | a | 61.71 | 6.40 | 4.23 |
| | | | | | b | 61.95 | 6.65 | 4.08 |
| 25 | S | —CH₂—CH₂— | —N(C₂H₅)₂ | C₂₀H₂₆N₂S·2HCl·½H₂O (204~5 (dec.)) | a | 58.81 | 7.16 | 6.87 |
| | | | | | b | 59.27 | 7.39 | 6.83 |
| 26 | S | —CH₂—CH₂—CH₂— | —N(C₂H₅)₂ | C₂₁H₂₈N₂S·2HCl·H₂O (217~9) | a | 58.45 | 7.48 | 6.50 |
| | | | | | b | 58.01 | 7.39 | 6.57 |
| 27 | O | —CH₂·CH₂— | —N⌬ | C₂₁H₂₆N₂O·C₄H₄O₄ (236~7 (dec.)) | a | 68.47 | 6.90 | 6.39 |
| | | | | | b | 68.50 | 6.81 | 6.18 |
| 28 | O | —CH₂·CH₂·CH₂— | —N(C₂H₅)(C₂H₅) | C₂₁H₂₈N₂O·C₄H₄O₄ (175~6 (dec.)) | a | 68.16 | 7.32 | 6.36 |
| | | | | | b | 67.86 | 7.22 | 6.29 |

See note at end of Table I.

NOTE.—C₄H₄O₄=Maleic acid.

TABLE V

| Number | X | A | R | Molecular formula (melting point, °C.) | | Elementary analysis (percent) | | |
|---|---|---|---|---|---|---|---|---|
| | | | | | | C | H | N |
| 29 | O | —CH₂·CH₂·CH₂— | —N⌬ | C₂₁H₂₆N₂O₂·C₄H₄O₄ (234~5 (dec.)) | a | 68.47 | 6.90 | 6.39 |
| | | | | | b | 68.23 | 6.76 | 6.54 |
| 30 | O | —CH₂·CH₂·CH₂— | —N⌬ | C₂₂H₂₈N₂O·C₄H₄O (228~9 (dec.)) | a | 69.00 | 7.13 | 6.19 |
| | | | | | b | 68.70 | 7.36 | 6.15 |
| 31 | S | —CH₂·CH₂— | —N(CH₃)(CH₃) | C₁₈H₂₂N₂·2HCl (254~5 (dec.)) | a | 58.23 | 6.51 | 7.54 |
| | | | | | b | 57.97 | 6.53 | 7.51 |
| 32 | S | —CH₂—CH₂— | —NHCH₃ | C₁₇H₂₀N₂S·2HCl (237~9 (dec.)) | a | 57.14 | 6.21 | 7.85 |
| | | | | | b | 57.11 | 6.13 | 7.74 |
| 33 | S | —CH₂·CH₂— | —N⌬ | C₂₀H₂₄N₂S·2HCl·½H₂O (179~180 (dec.)) | a | 59.11 | 6.70 | 6.89 |
| | | | | | b | 59.00 | 6.98 | 6.85 |
| 34 | S | —CH₂·CH₂— | —N⌬ | C₂₁H₂₆N₂S·2HCl·H₂O (227~8 (dec.)) | a | 58.72 | 7.04 | 6.53 |
| | | | | | b | 58.92 | 7.14 | 6.63 |

See note at end of Table I.

TABLE VI

| Number | X | A | R | Molecular formula (Melting point ° C.) | Elementary analysis (percent) | | |
|---|---|---|---|---|---|---|---|
| | | | | | C | H | N |
| 35 | S | —CH₂·CH₂— | —N◯O | C₂₀H₂₄N₂OS·2HCl·½H₂O (242~3 (dec.)) | a 56.85 b 57.39 | 6.44 6.64 | 6.63 6.61 |
| 36 | S | —CH₂·CH₂·CH₂— | —N(CH₃)(CH₃) | C₁₉H₂₄N₂S·2HCl·H₂O (222~4 (dec.)) | a 56.57 b 57.04 | 7.00 7.22 | 6.94 7.13 |
| 37 | S | —CH₂·CH₂·CH₂— | —NHNH₂ | C₁₈H₂₂N₃S·2HCl·½H₂O (208~10 (dec.)) | a 56.84 b 57.39 | 6.63 6.91 | 7.36 7.10 |
| 38 | S | —CH₂·CH₂·CH₂— | —N(C₂H₅)(C₂H₅) | C₂₁H₂₈N₂S·2HCl·½H₂O (225~7 (dec.)) | a 59.70 b 59.59 | 7.40 7.73 | 6.63 6.40 |
| 39 | S | —CH₂·CH₂·CH₂— | —N◯ | C₂₂H₂₈N₂S·2HCl·½H₂O (189~190 (dec.)) | a 60.81 b 60.81 | 7.19 7.46 | 6.45 6.28 |
| 40 | S | —CH₂·CH₂·CH₂— | —N◯O | C₂₁H₂₆N₂OS·2HCl·½H₂O (234~6 (dec.)) | a 57.78 b 57.61 | 6.70 6.58 | 6.42 6.54 |

See note at end of Table I.

TABLE VII

| Number | X | A | R | Molecular formula (Melting point (° C.)) | Elementary analysis (percent) | | |
|---|---|---|---|---|---|---|---|
| | | | | | C | H | N |
| 41 | S | —CH₂·CH— \| CH₃ | —N(CH₃)(CH₃) | C₁₉H₂₄N₂S·C₄H₄O₄ (128~130) | a 64.46 b 64.42 | 6.58 6.67 | 6.54 6.47 |
| 42 | S | —CH₂·CH— \| CH₃ | —N◯ | C₂₁H₂₆N₂S·C₄H₄O₄ (138~9) | a 66.06 b 65.85 | 6.65 6.64 | 6.19 6.01 |
| 43 | S | —CH₂—CH— \| CH₃ | —N◯ | C₂₂H₂₈N₂S·C₄H₄O₄ (159~161) | a 66.64 b 66.74 | 6.88 6.95 | 5.98 5.89 |
| 44 | S | —CH₂·CH— \| CH₃ | —N◯O | C₂₁H₂₆N₂OS·C₄H₄O₄ (172~3) | a 63.81 b 63.93 | 6.42 6.44 | 5.95 5.89 |

See note at end of Table I.

What we claim is:

1. 6-amino alkylene substituted 6,7-dihydro-5H-dibenzo[b,g], [1,5]thiazocines represented by the formula

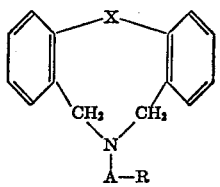

wherein X is sulfur, A is alkylene having 2 to 3 carbon atoms, and R is methylamino, dialkylamino, wherein each alkyl group has 1 to 2 carbon atoms; pyrrolidino, piperidino, or morpholino or pharmacologically acceptable salts thereof.

2. 6 - (β - diethylaminoethyl)-6,7-dihydro-5H-dibenzo[b,g], [1,5]thiazocine or its pharmacologically acceptable salts.

3. 6 - (γ-methylaminopropyl)-6,7-dihydro-5H-dibenzo[b,g], [1,5]thiazocine or its pharmacologically acceptable salts.

4. 6 - (γ-diethylaminopropyl)-6,7-dihydro-5H-dibenzo[b,g], [1,5]thiazocine or its pharmacologically acceptable salts.

5. 6 - (β-dimethylaminoethyl)-6,7-dihydro-5H-dibenzo[b,g], [1,5]thiazocine or its pharmacologically acceptable salts.

6. 6 - (γ - dimethylaminopropyl)-6,7-dihydro-5H-dibenzo[b,g], [1,5]thiazocine or its pharmacologically acceptable salts.

7. 6 - (γ - methylaminopropyl) - 6,7 - dihydro-5H-dibenzo[b,g], [1,5]thiazocine or its pharmacologically acceptable salts.

8. 6 - (β - dimethylamino-isopropyl)-6,7-dihydro-5H-dibenzo[b,g],[1,5]thiazocine or its pharmacologically acceptable salt.

9. 6 - (β - piperidino - isopropyl)6,7-dihydro-5H-dibenzo[b,g], [1,5]thiazocine or its pharmacologically acceptable salts.

10. 6 - (β - morpholino-isopropyl)-6,7-dihydro-5H-dibenzo[b,g], [1,5]thiazocine or its pharmacologically acceptable salts.

References Cited

Schindler et al., Chemical Abstracts, vol. 69, 96794k (1968).

NICHOLAS S. RIZZO, Primary Examiner

J. TOVAR, Assistant Examiner

U.S. Cl. X.R.

260—293.57, 326.81, 327 B, 327 R; 424—248